(12) United States Patent
Johnson

(10) Patent No.: US 10,618,624 B2
(45) Date of Patent: Apr. 14, 2020

(54) MOISTURE ACCUMULATION PREVENTION SYSTEMS AND METHODS

(71) Applicant: THE BOEING COMPANY, Chicago, IL (US)

(72) Inventor: Andrew T. Johnson, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 603 days.

(21) Appl. No.: 14/923,989

(22) Filed: Oct. 27, 2015

(65) Prior Publication Data

US 2017/0113776 A1   Apr. 27, 2017

(51) Int. Cl.
 *B64C 1/06*    (2006.01)
 *B64D 15/16*   (2006.01)
 *B64D 11/00*   (2006.01)

(52) U.S. Cl.
 CPC ............ *B64C 1/067* (2013.01); *B64D 15/163* (2013.01); *B64D 11/00* (2013.01)

(58) Field of Classification Search
 CPC .. F15C 1/04; F15C 1/005; F15C 1/006; F15C 1/004; B64C 1/067; B64D 15/163
 USPC ................ 137/804, 805, 827, 828, 830, 831
 See application file for complete search history.

(56) References Cited

U.S. PATENT DOCUMENTS

| | | | | |
|---|---|---|---|---|
| 3,740,905 | A * | 6/1973 | Adams | B64C 1/067 165/231 |
| 9,546,004 | B1 * | 1/2017 | Safai | B64D 45/00 |
| 2009/0120471 | A1 * | 5/2009 | Ludwiczak | B06B 3/00 134/115 R |
| 2009/0224104 | A1 * | 9/2009 | Tenebre | B64D 15/163 244/134 R |
| 2013/0032671 | A1 * | 2/2013 | Giles | B64D 15/16 244/134 R |
| 2014/0238234 | A1 * | 8/2014 | Horstman | B64D 13/06 95/39 |
| 2015/0210398 | A1 * | 7/2015 | Vue | B64D 13/06 165/41 |

* cited by examiner

*Primary Examiner* — Jessica B Wong
(74) *Attorney, Agent, or Firm* — The Small Patent Law Group LLC; Joseph M. Butscher

(57) ABSTRACT

An aircraft may include a fuselage, and a moisture accumulation prevention system that prevents moisture from accumulating on at least one structure within the fuselage. The moisture accumulation prevention system includes at least one ultrasonic element coupled to the structure(s). The ultrasonic element(s) operates at a frequency that prevents moisture particles from adhering to a surface of the structure(s).

23 Claims, 5 Drawing Sheets

MOISTURE ACCUMULATION PREVENTION SYSTEMS AND METHODS

FIELD OF THE DISCLOSURE

Embodiments of the present disclosure generally relate to systems and methods for preventing moisture from accumulating on surfaces, such as internal surfaces of a fuselage of an aircraft.

BACKGROUND OF THE DISCLOSURE

As an airplane is operated, condensation and deposition typically occur during various phases of flight. During aircraft design and manufacture, special consideration is given with respect to the potential of moisture accumulation within the airplane, so as to ensure that corrosion of various internal structures, short-circuiting, arcing, and/or degradation of electrical components, and the like, do not occur, as well as to minimize occupant discomfort from liquid water dropping from a ceiling of the airplane. In general, condensation and deposition are directly related to environmental conditions within an interior cabin of the airplane, and indirectly related to ambient conditions outside of the airplane when grounded. Passengers, crew, onboard meals, and onboard beverages may contribute to condensation within an airplane.

Water accumulation due to condensation and deposition occurs in both short and long range flights, but is generally more severe and excessive in continuous long-range flights over six hours having quick turn-around departures. Accordingly, various systems and methods have been developed to control and manage condensation within an airplane.

Many airplanes include various moisture management devices to minimize or otherwise reduce moisture within an interior cabin. For example, drainage paths within various structures, moisture impermeable insulation blankets, zonal air dryers (such as dehumidifiers), humidity control systems, and moisture management devices are used to capture and/or direct moisture away from an internal cabin interior and divert the moisture to a bilge, through which the moisture drains overboard via pressure valves.

Known moisture control systems and methods are configured to channel moisture after it accumulates on a surface and direct the moisture to a drainage system, for example. Such systems and methods generally add weight and cost to an aircraft. Further, assembling and manufacturing an aircraft having such systems and methods is time and labor intensive.

SUMMARY OF THE DISCLOSURE

A need exists for an efficient system and method of managing moisture onboard an aircraft, for example. A need exists for a system and method of preventing moisture accumulation on a surface (in contrast to draining condensed moisture that has accumulated on a surface).

With those needs in mind, certain embodiments of the present disclosure provide an aircraft that may include a fuselage, and a moisture accumulation prevention system that prevents moisture from accumulating on at least one structure within the fuselage. The moisture accumulation prevention system may include at least one ultrasonic element coupled to the structure(s). The ultrasonic element(s) operates at a frequency that prevents moisture particles from adhering to a surface of the structure(s). In at least one embodiment, the moisture accumulation prevention system may include a plurality of ultrasonic elements. In passenger airplanes, for example, the frequency may be substantially higher than that of a human hearing range. Optionally, the frequency may be lower when the system is used with non-passenger aircraft.

The moisture accumulation prevention system may also include at least one humidity sensor. The ultrasonic element(s) may be operated based on a moisture level detected by the humidity sensor(s).

The moisture accumulation prevention system may also include at least one temperature sensor configured to detect a temperature of one or both of the structure(s) or air proximate to the structure(s). The ultrasonic element(s) may be operated based on the temperature detected by the temperature sensor(s).

The moisture accumulation prevention system may include a control unit coupled to the ultrasonic element(s). The control unit may selectively control the ultrasonic element(s).

The aircraft may include a drainage assembly onboard the fuselage. The moisture particles may be drawn to the drainage assembly, such as by way of a ventilation system, and/or through airflow passing through the fuselage.

The ultrasonic element(s) may be mounted on the structure(s). Optionally, the ultrasonic element(s) may be embedded within the structure(s). In at least one other embodiment, the ultrasonic element(s) may be spaced apart from the structure(s).

Certain embodiments of the present disclosure provide a moisture accumulation prevention system configured to prevent moisture from accumulating on a structure. The moisture accumulation prevention system may include at least one ultrasonic element coupled to the structure. The ultrasonic element(s) operates at a frequency that prevents moisture particles from adhering to a surface of the structure.

Certain embodiments of the present disclosure provide a method of preventing moisture from accumulating on a structure. The method may include coupling at least one ultrasonic element to the structure, and operating the ultrasonic element(s) at a frequency that prevents moisture particles from adhering to a surface of the structure.

DETAILED DESCRIPTION OF THE DISCLOSURE

Figure 1:
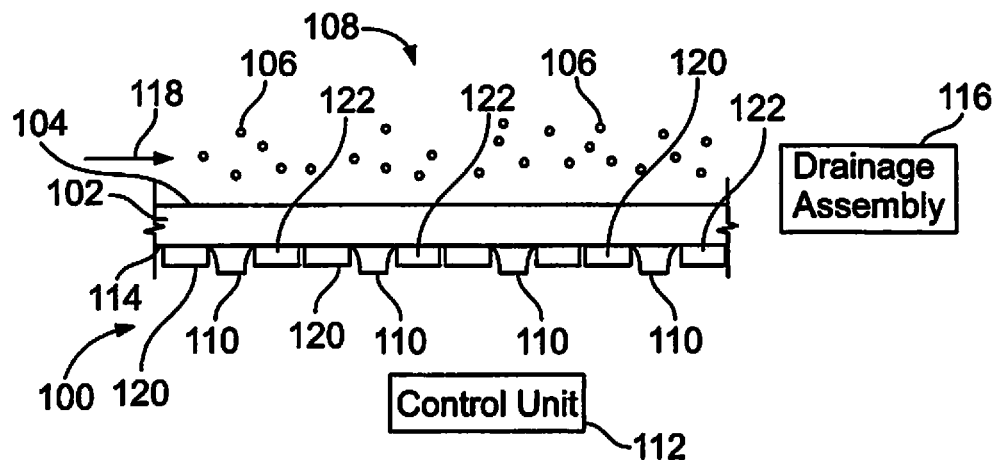
FIG. 1 illustrates a lateral view of a moisture accumulation prevention system coupled to a structure, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a low energy, active, moisture accumulation prevention system. The system is configured to suspend moisture in air as small particles. As such, the moisture does not accumulate on a surface. The suspended moisture is carried away from the surface instead of adhering to the surface. If the surface is an internal surface of an airplane fuselage skin, the moisture may eventually be carried out of the airplane through normal airplane ventilation, or deposited in a containment assembly (such as a bilge that is configured to carry accumulated liquid until the end of the flight and then automatically purge the liquid when the fuselage is an longer pressurized, or a base drain of a mix manifold).

Embodiments of the present disclosure provide a moisture accumulation prevention system that may include one or more ultrasonic energy sources. The system generates ultrasonic surface and/or planar acoustic waves into a surface, such as a cool condensing surface within a fuselage of an aircraft. The imparted ultrasonic energy within the structure prevents moisture from precipitating out of the air onto the surface. For example, the surface of a structure excited by the imparted ultrasonic energy repels the moisture particles. The ultrasonic energy source(s) may be either attached to the surface of a structure, embedded within, and/or otherwise proximate to the structure. For example, the ultrasonic energy source may be or include an ultrasonic speaker that generates ultrasonic energy having an impedance that matched to the material for efficient energy transmission. If an array of ultrasonic energy sources is used, a static ultrasonic field may have areas of destructive interference in which there is insufficient energy to prevent accumulation. Accordingly, the ultrasonic field may be modulated in with respect to it controlled frequency or phase relationship of the ultrasonic energy sources.

In at least one embodiment, the ultrasonic energy source may include a piezoelectric transducer, for example. The frequency and wave type may be selected based on a combination of several criteria. For example, the frequency and wave type may be selected to minimize energy demand, maximize efficiency, and minimize cost, while not affecting the comfort of individuals proximate to the system (such as passengers aboard an aircraft).

Certain embodiments of the present disclosure may utilize very high frequency ultrasound to vaporize water contained in or on the surface of materials (in contrast to preventing deposition). Certain embodiments of the present disclosure may include moisture and temperature sensors, and an array of ultrasonic transducers coupled to a control unit that may identify and locate humidity, condensation, and frost problems from data obtained from the sensors and prevent or eliminate the identified problems by selective control of volume (amplitude), frequency, and phase of individual transducers. The control unit may localize the application of ultrasound by controlling individual transducers and their frequency and phase to selectively reinforce or interfere with the delivered signal. The control unit may eliminate condensation and frost as detected by the sensors, by controlling volume (amplitude), frequency, and phase of the ultrasonic transducers.

FIG. 1 illustrates a simplified lateral view of a moisture accumulation prevention system 100 coupled to a structure 102, according to an embodiment of the present disclosure. The structure 102 may be an internal wall or portion of a fuselage of an aircraft or other vehicle in at least one other embodiment, the structure 102 may be various other structures that may be susceptible to moisture condensation, such as a wall or door of a freezer, refrigerator, and/or the like.

The moisture accumulation prevention system 100 is configured to prevent moisture from condensing or otherwise depositing on a surface 104 of the structure 102. The moisture accumulation prevention system 100 is configured to prevent moisture particles 106 from adhering to the surface 104 by suspending the moisture particles 106 in air 108. For example, ultrasonic elements 110 may be operated to impart ultrasonic energy onto and/or into the structure 102. The ultrasonic energy excites the structure 102 so that the structure 102 resonates to repel the moisture particles 106.

The moisture accumulation prevent system 100 may include a plurality of ultrasonic elements 110 operatively coupled to a control unit 112. The ultrasonic elements 110 may be or include ultrasonic speakers, horns, phased array transducers, piezo electrics, and/or the like. The ultrasonic elements 110 may be directly mounted onto the structure 102. For example, the ultrasonic elements 110 may be directly mounted onto a surface 114 that is opposite from the surface 104 on which moisture accumulation is controlled. In at least one other embodiment, the ultrasonic elements 110 may be positioned directly on the surface 104 or embedded within the structure 102 (as shown in FIG. 2, for example). In at least one other embodiment, the ultrasonic elements 110 may be separated from the structure 102 and may be configured to emit ultrasonic energy through the air that impinges onto and into the structure 102 (as shown in FIG. 3, for example).

Each ultrasonic element 110 may include and/or be coupled to a driver (such as a piezo electric driver, an electromechanical speaker or actuator, and/or the like) that is configured to drive the ultrasonic element 110 at a moisture accumulation prevention frequency. Each ultrasonic element 110 may be powered by a separate and distinct power source, such as a battery, a power outlet, and/or a power source of a structure or vehicle (such as a battery, engine, and/or the like).

The ultrasonic elements 110 are configured to emit or otherwise deliver ultrasonic energy onto and/or into the structure 102. The ultrasonic energy excites the surface 104 of the structure 102, thereby causing the structure 102 to vibrate. The vibrating structure 102 prevents the moisture particles 106 from adhering to the surface 104.

The control unit 112 controls operation of the ultrasonic elements 110. The control unit 112 may be operatively coupled to and in communication with the ultrasonic elements 110 through wired or wireless connections. The control unit 112 may operate the ultrasonic elements 110 at a frequency that exceeds a range of normal human hearing. For example, the control unit 112 may drive the ultrasonic elements 110 at frequencies that exceed 50 kHz. In at least one embodiment, the control unit 112 may operate the ultrasonic elements 110 at 100 kHz. It has been found that a frequency that exceeds 50 kHz is great enough to be inaudible to humans, and ensure that the moisture particles 106 are suspended as very fine particles within the air 108. It has been found that a frequency of 100 kHz effectively suspends the moisture particles 106 in the air (and, as such, prevents the moisture particles 106 from adhering to the surface 104), while at the same time being many times greater than a frequency that is audible to humans.

The moisture particles 106 suspended in the air 108 may be directed to a drainage assembly 116, such as that within a fuselage of an aircraft. For example, the drainage assembly 116 may include one or more pipes, mix manifold or scupper drains, tubes, bilges with deck drain valves, and/or the like that draw the moisture particles 106 away from the structure 102. Airflow 118 such as generated by a ventilation system or existing within an aircraft) may force the moisture particles 106 into the drainage assembly 116. Alternatively, the moisture accumulation prevention system 100 may not include the drainage assembly 116.

As shown, the moisture accumulation prevention system 100 may include a plurality of ultrasonic elements 110. The ultrasonic elements 110 may form an array. Neighboring (that is, closest) ultrasonic elements 110 may abut into each other. Optionally, each ultrasonic element 110 may be spaced apart from a nearest, neighboring ultrasonic element 110. The ultrasonic elements 110 may be mounted to the structure 102 at areas in which moisture accumulation prevention is desired. Optionally, more or less ultrasonic elements 110 than shown may be used. For example, the moisture accumulation prevention system 100 may include a single ultrasonic element 110 coupled to the structure 102 (such as through direct mounting, embedded into the structure 102, or spaced a distance from the structure 102).

The moisture accumulation prevention system 100 may also include one or more humidity sensors 120 and/or one or more temperature sensors 122 coupled to the structure 102. As shown, each ultrasonic element 110 may be associated with a humidity sensor 120 and a temperature sensor 122. Optionally, the moisture accumulation prevention system 100 may include more or less humidity sensors 120 and temperature sensors 122 than shown. In at least one embodiment, the moisture accumulation prevention system 100 may not include any humidity sensors and/or temperature sensors.

Each humidity sensor 120 is configured to detect a presence of moisture (for example, humidity) within the air 108. For example, the humidity sensors 120 may be humidistats. The humidity sensors 120 may be coupled to and in communication with the control unit 112, such as through wired or wireless connections. In this manner, the control unit 112 is able to monitor a moisture level within the air 108 through moisture signals received from the humidity sensors 120, and selectively activate and deactivate the ultrasonic elements 110 based on the received moisture signals. For example, the control unit 112 may activate the ultrasonic elements 110 in response to an excessive moisture threshold being met or exceeded.

Each temperature sensor 122 may be configured to detect a temperature of the air 108 and/or the structure 102. For example, the temperature sensors 122 may be thermistors or thermocouples. The temperature sensors 122 may be coupled to and in communication with the control unit 112, such as through wired or wireless connections. As such, the control unit 112 is able to monitor a temperature of the structure 102 and/or the air 108 through temperature signals received from the temperature sensors 122, and selectively activate and deactivate the ultrasonic elements 110 based on the received temperature signals. For example, the control unit 112 may activate the ultrasonic elements 110 in response to a predetermined temperature threshold being met (such as a predetermined low temperature that may otherwise lead to condensation on the structure 102).

In operation, the control unit 112 monitors the structure 102 to determine areas in which moisture particles 106 are present. For example, the control unit 112 may determine the presence of the moisture particles 106 through analysis of signals received from the humidity sensors 120, or the propensity for moisture to precipitate out with temperature sensors 122. The control unit 112 may then selectively activate and deactivate the ultrasonic elements 110 based on areas where the moisture particles 106 are present. The control unit 112 may selectively control an amplitude or volume, frequency, and/or phase of the individual ultrasonic elements 110 to impart ultrasonic energy into the structure 102. The imparted ultrasonic energy causes areas of the structure 102 to resonant, which prevents the moisture particles 106 from adhering to the surface 104. As such the moisture particles 106 remain suspended in the air 108, and may be drawn into the drainage assembly 116.

Based on the signals received from the humidity sensors 120 and/or the temperature sensors 122, the control unit 112 is able to localize application of ultrasonic energy in relation to the structure 102 by controlling individual ultrasonic elements 110. For example, the control unit 112 may control one or more of an amplitude, frequency, and/or phase of each ultrasonic element 110 to selectively reinforce or interfere with outputs of other ultrasonic elements 110. The ultrasonic energy imparted into the structure 102 through the ultrasonic elements 110 prevents the moisture particles 106 from precipitating out of the air 108 onto the surface 104. Alternatively, the moisture accumulation prevention system 100 may not include the control unit 112. Instead, the ultrasonic elements 110 may be configured to be continually active at a moisture accumulation prevention frequency, such as 50 kHz, 100 kHz, or greater.

As described above, the control unit 112 may be used to control operation of the moisture accumulation prevention system 100. As used herein, the term “control unit,” “unit,” “central processing unit,” “CPU,” “computer,” or the like may include any processor-based or microprocessor-based system including systems using microcontrollers, reduced instruction set computers (RISC), application specific integrated circuits (ASICs), digital signal processor (DSP), logic circuits, and any other circuit or processor including hardware, software, or a combination thereof capable of executing the functions described herein. Such are exemplary only, and are thus not intended to limit in any way the definition and/or meaning of such terms. For example, the control unit 112 may be or include one or more processors that are configured to control operation of the moisture accumulation prevention system 100.

The control unit 112 is configured to execute a set of instructions that are stored in one or more storage elements (such as one or more memories), in order to process data. For example, the control unit 112 may include or be coupled to one or more memories. The storage elements may also store data or other information as desired or needed. The storage elements may be in the form of an information source or a physical memory element within a processing machine.

The set of instructions may include various commands that instruct the control unit 112 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the control unit 112. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 112 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 2:
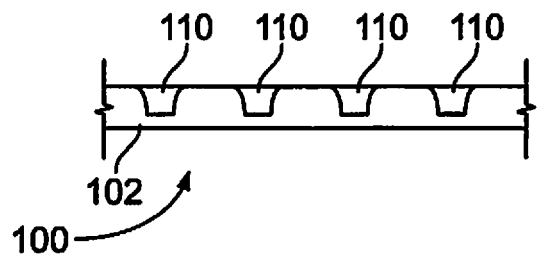
FIG. 2 illustrates a simplified lateral view of a moisture accumulation prevention system coupled to a structure, according to an embodiment of the present disclosure.

FIG. 2 illustrates a simplified lateral view of the moisture accumulation prevention system 100 coupled to the structure 102, according to an embodiment of the present disclosure. The moisture accumulation prevention system 100 is similar to that shown and described with respect to FIG. 1, except that the ultrasonic elements 110 may be embedded within the structure 102.

Figure 3:
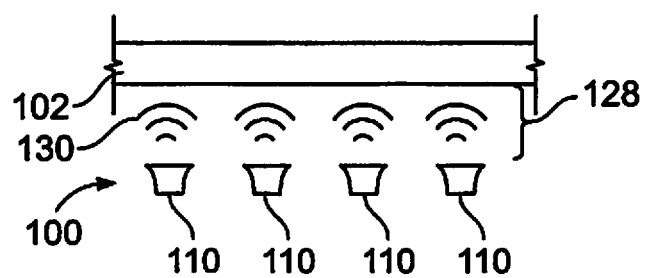
FIG. 3 illustrates a simplified lateral view of a moisture accumulation prevention system coupled to a structure, according to an embodiment of the present disclosure.

FIG. 3 illustrates a simplified lateral view of the moisture accumulation prevention system 100 coupled to the structure 102, according to an embodiment of the present disclosure. The moisture accumulation prevention system 100 is similar to that shown and described with respect to FIG. 1, except that the ultrasonic elements 110 may be spaced apart a distance 128 from the structure 102, and configured to generate, transmit, and impart ultrasonic energy 130 into the structure 102. The distance 128 is within a range in which the ultrasonic energy 130 transmitted from the ultrasonic elements 110 reaches the structure with sufficient energy to excite the structure 102 to a resonant frequency that prevents moisture particles from adhering thereto. For example, the distance 128 may be less than 2 inches.

Figure 4:
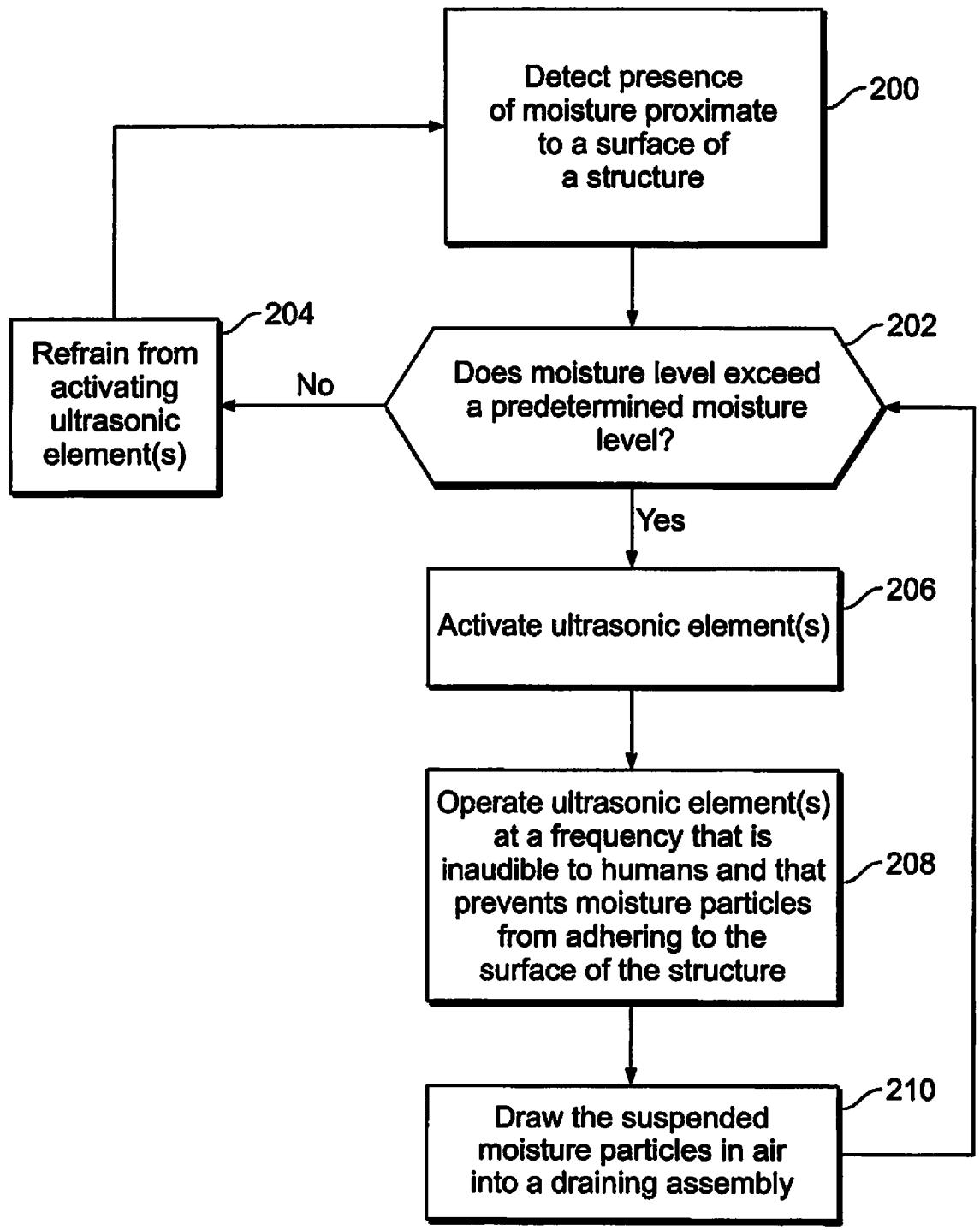
FIG. 4 illustrates a flow chart of a method of preventing moisture from accumulating on a structure, according to an embodiment of the present disclosure.

FIG. 4 illustrates a flow chart of a method of preventing moisture from accumulating on a structure, according to an embodiment of the present disclosure. The control unit 112 may be used to control the moisture accumulation prevention system 100 (shown in FIGS. 1-3) according to the flow chart shown in FIG. 4.

At 200, a presence of moisture is detected proximate to (such as within 5 feet or less) a surface of a structure. For example, the control unit may be in communication with one or more humidity sensors and/or one or more temperature sensors mounted on or proximate to the structure. Based on signals received from the humidity sensors and/or the temperature sensors, the control unit may determine a moisture level on or proximate to the structure.

At 202, it is determined whether the detected moisture level meets or exceeds a predetermined moisture level. For example, the predetermined moisture level may be a moisture level at which moisture particles would otherwise be susceptible to condensing (or within seconds of condensing) on the structure. If the detected moisture level does not meet or exceed the predetermined moisture level, the method proceeds from 202 to 204, in which the ultrasonic element(s) are not activated. The method then returns to 200.

If, however, the moisture level does meet or exceed the predetermined moisture level at 202, the method proceeds to 206, in which the ultrasonic element(s) are activated. At 208, the ultrasonic element(s) are operated at a frequency that is inaudible to humans and that prevents moisture particles from adhering to the surface of the structure. For example, the frequency may be or exceed 50 kHz. The ultrasonic element(s) imparts the ultrasonic energy into the structure, which resonates the structure at a frequency that prevents moisture particles from adhering to the structure. As such, the moisture particles remain suspended in air. At 210, the suspended moisture particles may then be drawn into a drainage assembly, such as through ventilation and/or natural airflow over or through the structure. The method then returns to 202.

Optionally, steps 200, 202, and 204 may be omitted. Also, optionally, step 210 may be omitted.

Figure 5:
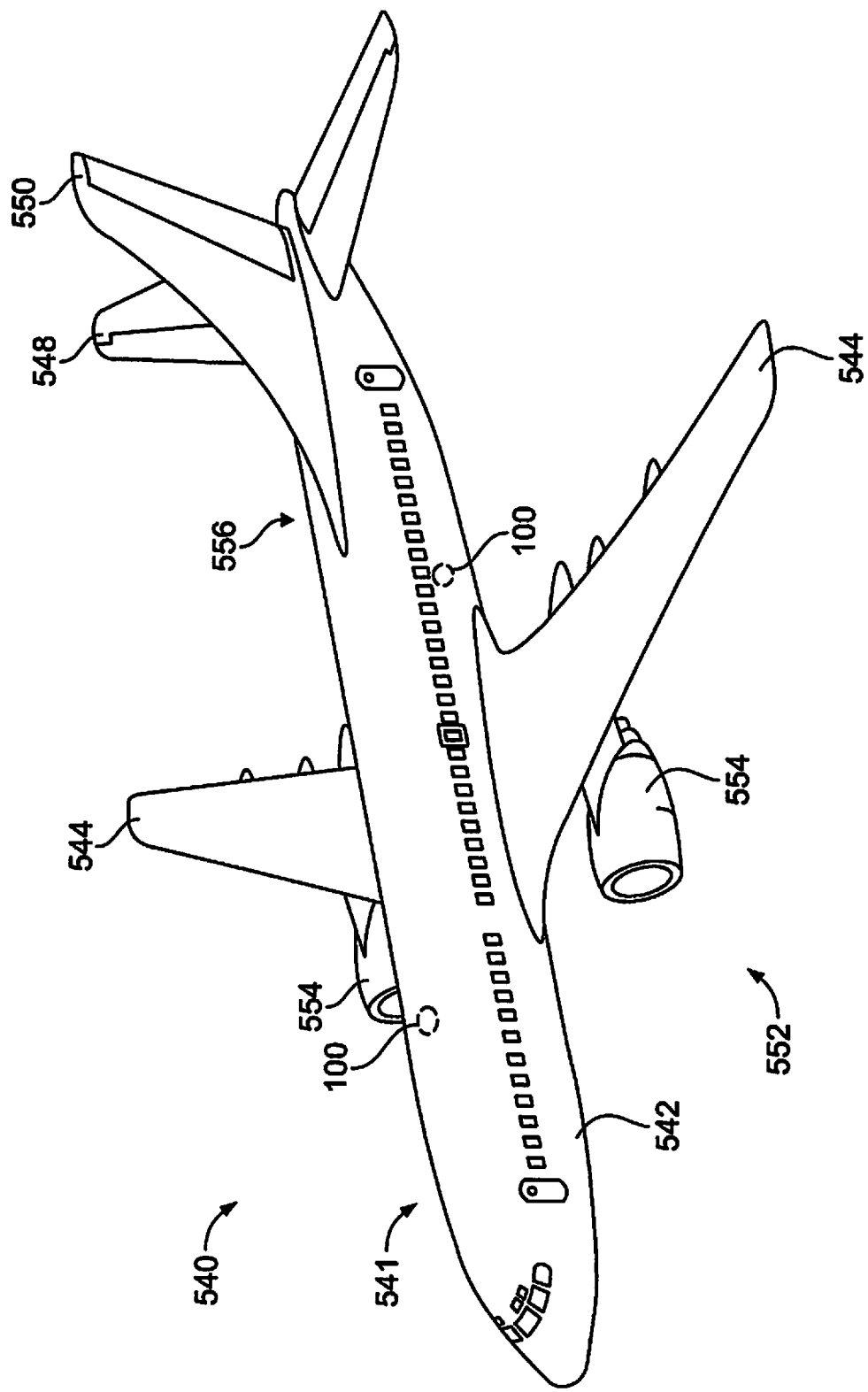
FIG. 5 illustrates a perspective top view of an aircraft, according to an embodiment of the present disclosure.

FIG. 5 illustrates a perspective top view of an aircraft 540, according to an embodiment of the present disclosure. The aircraft 540 is an example of a system having a main system structure 541 that may be coupled to one or more moisture accumulation prevention systems 100, as described above. For example, the moisture accumulation prevention systems 100 may be configured to prevent moisture from accumulating on interior walls, frames, and/or the like of a fuselage 542 of the aircraft 540. The aircraft 540 may include a propulsion system 552 that may include two turbofan engines 554. The engines 554 are carried by the wings 544 of the aircraft 540. In other embodiments, the engines 554 may be carried by the fuselage 542 and/or the empennage 556. The empennage 556 may also support horizontal stabilizers 548 and a vertical stabilizer 550.

As noted above, the moisture accumulation prevention systems 100 may be used with various other vehicles other than aircraft. For example, the moisture accumulation prevention systems 100 may be used with land based vehicles (such as automobiles, trains, and the like), water craft (such as boats), spacecraft, and the like. Further, the moisture accumulation prevention systems 100 may be used with fixed structures, such as with respect to interior walls and frames of a high rise building. In other embodiments, the moisture accumulation prevention systems 100 may be used with respect to various assemblies, systems, and structures that may be susceptible to condensation, such as cooling systems (for example, freezers, refrigerators, heat exchangers, heat pumps, and/or the like).

Figure 6:
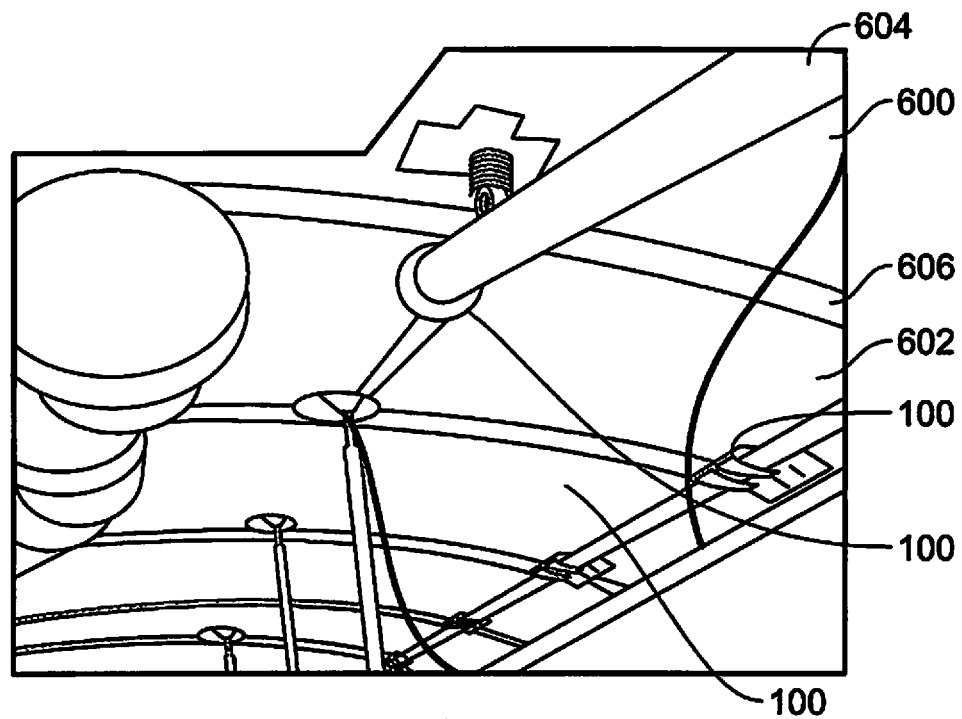
FIG. 6 illustrates a perspective internal view of a portion of a fuselage of an aircraft, according to an embodiment of the present disclosure.

FIG. 6 illustrates a perspective internal view of a portion of a fuselage 600 of an aircraft, according to an embodiment of the present disclosure. The fuselage 600 defines an internal chamber 602 that may include structural supports, such as beams 604 and cross beams 606 that support panels. A moisture accumulation prevention assembly 100 may be secured around joints on or between beams 604 and 606. Further, a moisture accumulation prevention assembly 100 may be positioned underneath structural panels (hidden from view).

Figure 7:
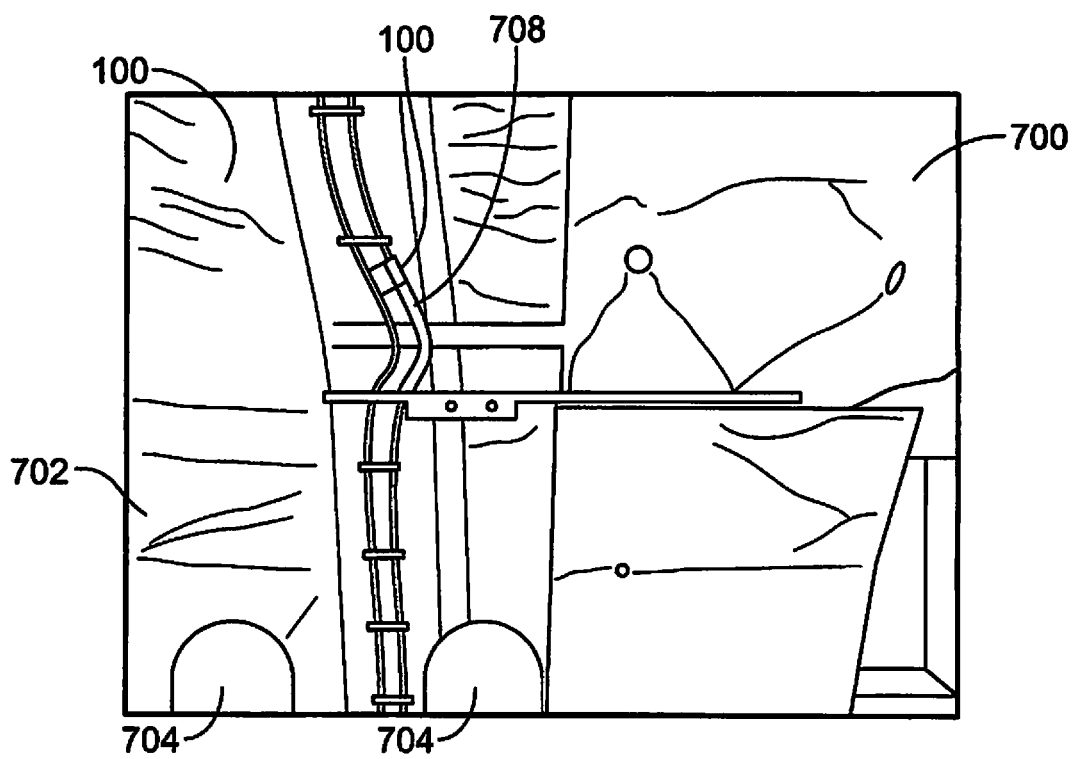
FIG. 7 illustrates a perspective internal view of a passenger cabin of an aircraft, according to an embodiment of the present disclosure.

FIG. 7 illustrates a perspective internal view of a passenger cabin 700 of an aircraft, according to an embodiment of the present disclosure. The passenger cabin 700 includes an outer wall 702 that defines one or more windows 704. For the sake of clarity, an inner covering wall is not shown in FIG. 7. A moisture accumulation prevention system 100, in the form of a material strip, may coupled to (for example, wrapped around, mounted on, and/or the like) a portion of an electrical cable 708. Further, one or more environmental aspect control assemblies 100 in the form of insulation panels may be secured between the outer wall 702 and the inner covering wall.

Figure 8:
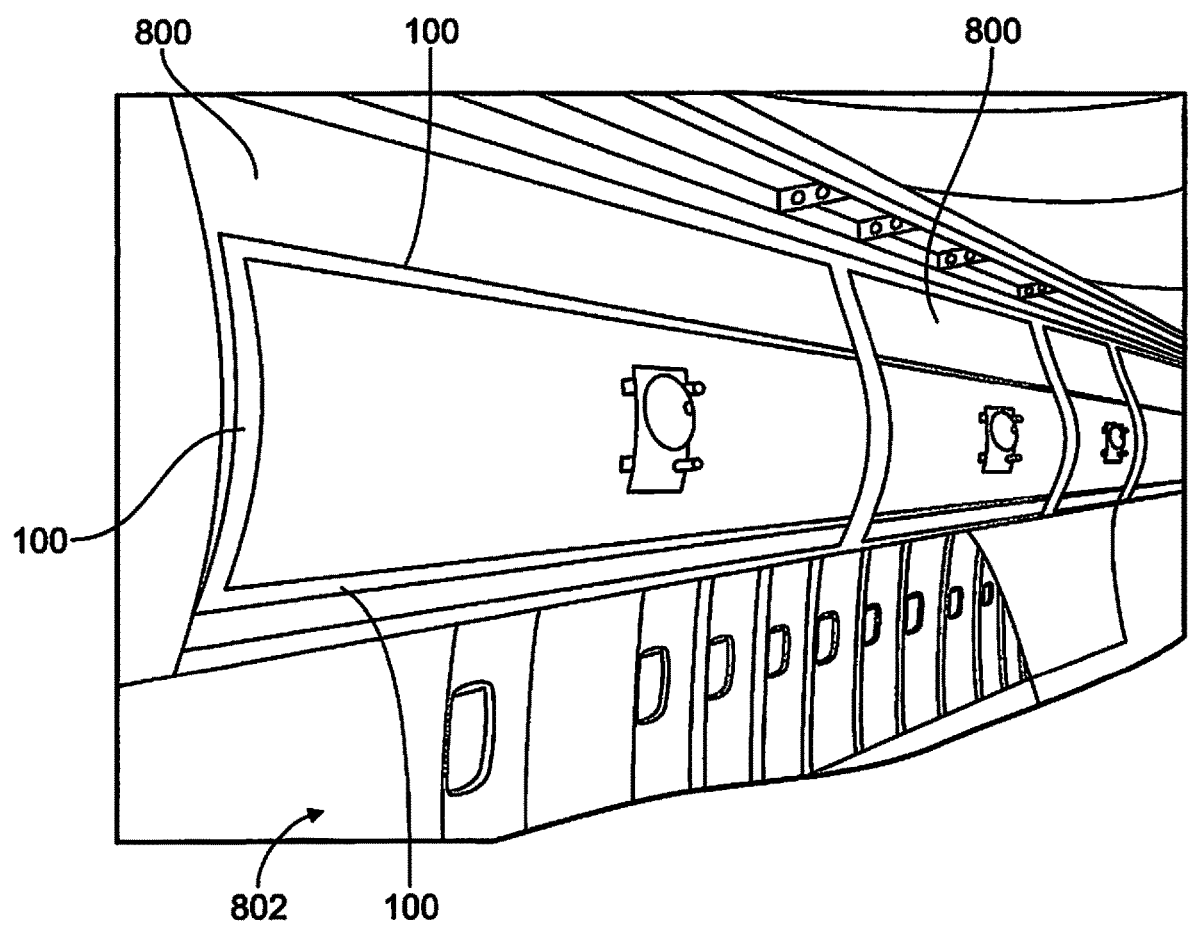
FIG. 8 illustrates a perspective view of ceiling panels within a passenger cabin of an aircraft, according to an embodiment of the present disclosure.

FIG. 8 illustrates a perspective view of ceiling panels 800 within a passenger cabin 802 of an aircraft, according to an embodiment of the present disclosure. A plurality of moisture accumulation prevention systems 100, in the form of linear strips, may be secured around or otherwise to portions of the ceiling panels 800.

Referring to FIGS. 5-8, one or more moisture accumulation prevention systems 100 may be used to control moisture accumulation within a fuselage of an aircraft. The moisture accumulation prevention system(s) 100 prevents moisture from adhering to surfaces of aircraft structures. Instead of condensing on aircraft structure, moisture particles remain suspended in air and may be drawn to a drainage assembly.

Referring to FIGS. 1-8, embodiments of the present disclosure provide efficient systems and methods of managing moisture onboard an aircraft, for example. Embodiments of the present disclosure provide systems and methods of preventing moisture accumulation on structures.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope.

While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the lateral language of the claims.

What is claimed is:

1. An aircraft comprising:
a fuselage; and
a moisture accumulation prevention system that prevents liquid from accumulating on at least one structure within the fuselage, wherein the moisture accumulation prevention system comprises at least one ultrasonic element coupled to the at least one structure, wherein the at least one ultrasonic element operates at an ultrasonic frequency that prevents liquid particles from adhering to a surface of the at least one structure.

2. The aircraft of claim 1, wherein the at least one ultrasonic element comprises a plurality of ultrasonic elements.

3. The aircraft of claim 1, wherein the ultrasonic frequency equals or exceeds 50 kHz.

4. The aircraft of claim 1, wherein the moisture accumulation prevention system further comprises at least one humidity sensor, wherein the at least one ultrasonic element is operated based on a moisture level detected by the at least one humidity sensor.

5. The aircraft of claim 1, wherein the moisture accumulation prevention system further comprises at least one temperature sensor configured to detect a temperature of one or both of the at least one structure or air proximate to the at least one structure, wherein the at least one ultrasonic element is operated based on the temperature detected by the at least one temperature sensor.

6. The aircraft of claim 1, wherein the moisture accumulation prevention system further comprises a control unit coupled to the at least one ultrasonic element, wherein the control unit selectively controls the at least one ultrasonic element.

7. The aircraft of claim 1, further comprising a drainage assembly onboard the fuselage, wherein the liquid particles are drawn to the drainage assembly.

8. The aircraft of claim 1, wherein the at least one ultrasonic element is mounted on the at least one structure.

9. The aircraft of claim 1, wherein the at least one ultrasonic element is embedded within the at least one structure.

10. The aircraft of claim 1, wherein the at least one ultrasonic element is spaced apart from the at least one structure.

11. A moisture accumulation prevention system configured to prevent liquid from accumulating on a structure within a fuselage, the moisture accumulation prevention system comprising:
    at least one ultrasonic element coupled to the structure, wherein the at least one ultrasonic element operates at an ultrasonic frequency that prevents liquid particles from adhering to a surface of the structure.

12. The moisture accumulation prevention system of claim 11, wherein the at least one ultrasonic element comprises a plurality of ultrasonic elements.

13. The moisture accumulation prevention system of claim 11, wherein the ultrasonic frequency equals or exceeds 50 kHz.

14. The moisture accumulation prevention system of claim 11, further comprising at least one humidity sensor, wherein the at least one ultrasonic element is operated based on a moisture level detected by the at least one humidity sensor.

15. The moisture accumulation prevention system of claim 11, further comprising at least one temperature sensor configured to detect a temperature of one or both of the at least one structure or air proximate to the at least one structure, wherein the at least one ultrasonic element is operated based on the temperature detected by the at least one temperature sensor.

16. The moisture accumulation prevention system of claim 11, further comprising a control unit coupled to the at least one ultrasonic element, wherein the control unit selectively controls the at least one ultrasonic element.

17. The moisture accumulation prevention system of claim 11, wherein the at least one ultrasonic element is mounted on the structure.

18. The moisture accumulation prevention system of claim 11, wherein the at least one ultrasonic element is embedded within the structure.

19. The moisture accumulation prevention system of claim 11, wherein the at least one ultrasonic element is spaced apart from the structure.

20. A method of preventing liquid from accumulating on a structure within a fuselage, the method comprising:
    coupling at least one ultrasonic element to the structure; and
    operating the at least one ultrasonic element at an ultrasonic frequency that prevents liquid particles from adhering to a surface of the structure.

21. The method of claim 20, wherein the ultrasonic frequency equals or exceeds 50 kHz.

22. The method of claim 20, wherein the operating comprises operating the at least one ultrasonic element based on a moisture level detected by at least one humidity sensor.

23. The method of claim 20, wherein the operating comprises operating the at least one ultrasonic element based on a temperature detected by at least one temperature sensor.

* * * * *